(12) United States Patent  
Memory et al.

(10) Patent No.: US 7,669,538 B2  
(45) Date of Patent: Mar. 2, 2010

(54) AIR VELOCITY INDICATOR AND CONTROL DEVICE

(75) Inventors: Russell J. Memory, Saskatoon (CA); Blake R. Neudorf, Warman (CA)

(73) Assignee: CNH Canada, Ltd., Saskatoon, SK (CA)

( * ) Notice: Subject to any disclaimer, the term of this patent is extended or adjusted under 35 U.S.C. 154(b) by 0 days.

(21) Appl. No.: 11/964,414

(22) Filed: Dec. 26, 2007

(65) Prior Publication Data

US 2009/0165686 A1    Jul. 2, 2009

(51) Int. Cl.
*A01C 7/00* (2006.01)
*A01C 9/00* (2006.01)
*A01C 15/00* (2006.01)

(52) U.S. Cl. .................. 111/174; 111/200; 111/903

(58) Field of Classification Search .............. 111/170, 111/174–176, 183–185, 200, 900, 903, 904, 111/921, 922
See application file for complete search history.

(56) References Cited

U.S. PATENT DOCUMENTS

| | | | |
|---|---|---|---|
| 1,331,861 A | 2/1920 | Callan | |
| 1,747,536 A | 2/1930 | Aernout | |
| 2,116,911 A | 5/1938 | Richardson | |
| 2,116,912 A | 5/1938 | Richardson | |
| 3,240,062 A | 3/1966 | Fredricksson | |
| 3,370,464 A | 2/1968 | Melton | |
| 3,422,776 A | 1/1969 | Gregory, Jr. | |
| 3,881,631 A | 5/1975 | Loesch et al. | |
| 5,979,343 A | 11/1999 | Gregor et al. | |
| 6,834,599 B1 | 12/2004 | Fuessel et al. | |
| 7,162,962 B2 | 1/2007 | Fuessel et al. | |
| 2007/0022928 A1 | 2/2007 | Kowalchuk | |

*Primary Examiner*—Christopher J. Novosad
(74) *Attorney, Agent, or Firm*—Rebecca L. Henkel; John William Stader

(57) ABSTRACT

An air velocity indicator and control device is provided for use with pneumatic distribution systems used in air seeders that pneumatically discharge agricultural product to the ground, seedbed, or furrow. The air velocity indicator and control device includes a tubular housing, extending between an inlet and an outlet, and pivotally housing a deflectable plate that actuates in response to encountering an airflow entrained with agricultural product. A magnitude of deflection of the deflectable plate, corresponding to airflow velocity, can be displayed through an indicator assembly. This enables a user to identify velocity variances and differentials within the air seeder and make corrective adjustments. In some implementations, multiple air velocity indicator and control devices are ganged together with deflectable plates that pivot in unison with each other. The relative angle of fixation of the deflectable plates, upon the pivot pin, can be adjusted to permit airflow tuning as needed.

9 Claims, 3 Drawing Sheets

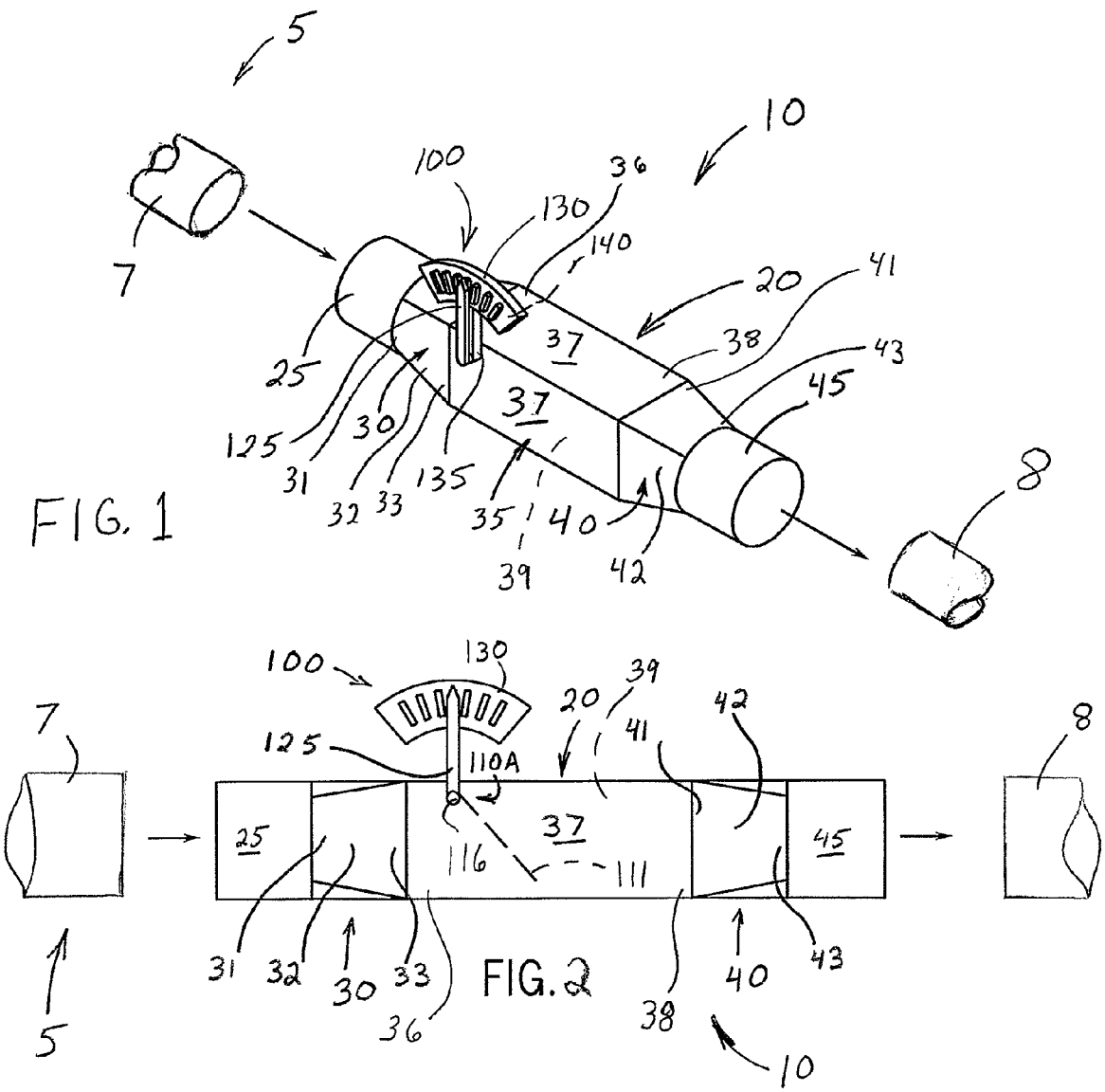

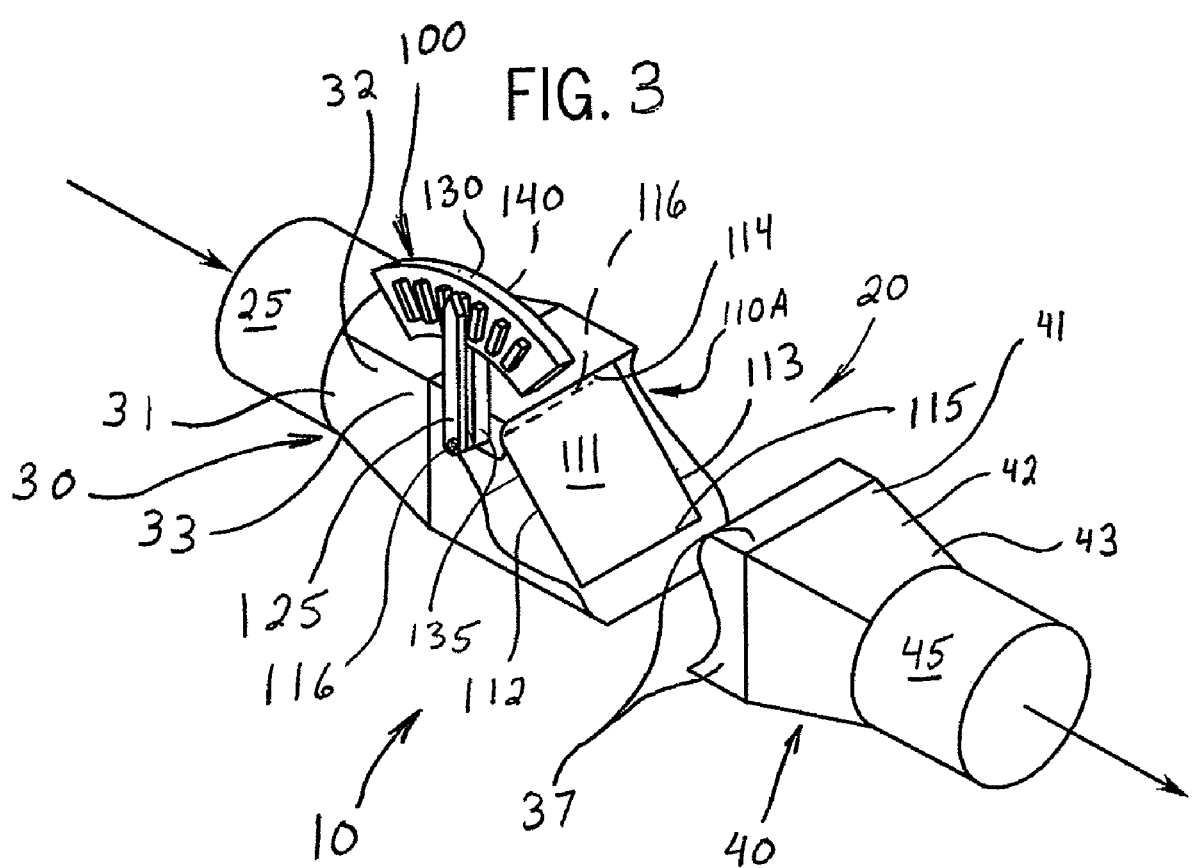

AIR VELOCITY INDICATOR AND CONTROL DEVICE

FIELD OF THE INVENTION

The invention relates generally to pneumatic particulate matter distribution systems for agricultural applications, and in particular, to a device and corresponding method for monitoring and regulating airflow rate differentials between multiple air lines in such pneumatic particulate matter distribution systems.

BACKGROUND OF THE INVENTION

Modern pneumatic particulate distribution systems, commonly referred to as air seeders, are used to distribute seed, fertilizer, or other particulate matter during various agricultural practices. Air seeders typically include an air cart and a tilling implement which are towed in tandem behind a tractor.

The air cart includes a frame riding upon wheels and tires, and one or more frame-mounted product tanks for holding granular product, such as seed, fertilizer, herbicide and/or other product. The product tanks are each connected to a product metering device which feeds the product into a pneumatic distribution system in a controlled manner. Typically various components within the product metering device(s) and/or pneumatic distribution system(s) are controlled by any of a variety of suitable electronic controls.

In general, the pneumatic distribution system functions to intake granular product from the metering device, transport it to the tilling implement, and then deliver the product to the field. In particular, the pneumatic distribution system includes a primary distribution manifold that intakes the product from the metering device and also an airflow from a centrifugal fan. The rotational speed of the centrifugal fan can be controlled by such electronic controls, as desired.

Controlling the rotational speed of the centrifugal fan influences a resultant airflow velocity within the pneumatic distribution system. Furthermore, the airflow velocity within the pneumatic distribution system can be influenced by, e.g., articulating baffles placed with the system that can be "opened" to provide relatively less system flow resistance or "closed" to provide relatively more system flow resistance. Typically, such baffles are placed upstream in the pneumatic distribution system; in other words, between the centrifugal fan and the primary distribution manifold.

The primary distribution manifold intakes an airflow delivered by the centrifugal fan and product delivered by the metering device into a common chamber, whereby the product is introduced into and becomes entrained in the airflow. The primary distribution manifold divides the airflow(s) and directs the airflow and the entrained product through multiple air cart air lines. The air cart air lines attach to a series of secondary distribution manifolds, commonly referred to as "headers," typically at the tilling implement. The headers further distribute the airflow and entrained product through multiple implement distribution air lines, to multiple ground openers on the tilling implement. At this point, the air bleeds off through an air vent, whereby the product falls by way of gravity to the ground or seedbed. Optionally, the product falls by way of gravity into a planting unit for singulation prior to seedbed or furrow delivery.

The use of precision-type agricultural practices is becoming increasingly popular, as is the desire to improve the operating efficiency of agricultural equipment. In light of precision-type agricultural practices and desire to improve efficiency, known air seeders exhibit certain limitations. For example, at times during use, various components of the pneumatic distribution system can encounter flow resistances and corresponding operating pressures and flow velocities that are outside of a desired or optimal range. Such non-desired operating parameters can be effectuated at least in part by, e.g., (i) the distance that the airflow and entrained product travels within the pneumatic distribution system, (ii) the numerous mechanical interfaces that the airflow and entrained product encounters during system travel, e.g., couplers, baffles, or other structures within manifolds, arcuate lengths of air line sidewalls, (iii) wear and maintenance status of components within the pneumatic distribution system, and (iv) various other factors and conditions.

Such occurrences of non-desired operating air line resistances, pressures, and flow velocities typically include non-equal magnitudes of airflow velocity, or airflow velocity differentials, between the various air lines within the air distribution system. As a result, the integrity and consistency of the seeding volume as a function of time and/or seed distribution pattern upon the ground, field, seedbed, or furrow can be compromised. Correspondingly, overseeding, underseeding, or inconsistent seeding distribution patterns can result.

Airflow velocity differentials typically result from at least one air line having a relatively lower airflow resistance value, and correspondingly a relatively higher or excessive airflow velocity value, as compared to the other air lines within the pneumatic distribution system. This excessive airflow velocity requires higher static air line pressure(s) to transmit, which in turn requires more power input to achieve, potentially wasting energy in the process. Furthermore, the excessive airflow velocity causes excessive abrasive wear to the inner surfaces of the air line. Namely, the airflow entrained product collides with such inner surfaces at a corresponding greater velocity, thus with more force and greater frequency, thereby causing more abrasive damage. Conversely, a minimum airflow velocity must be maintained to suitably entrain and transport the product through the air seeder, whereby airflow velocities falling below the minimum can result in plugging, clogging, or accumulation of product within the pneumatic delivery system.

Previous attempts have been made to equalize the pressures and airflow velocities between various air lines in seeders, to decrease the magnitude of the airflow velocity differential. For example, devices and corresponding methods have been previously provided for monitoring particle velocity of the airflow entrained product and controlling a flow restricting damper or the rotational velocity of the centrifugal fan in accordance therewith, to mitigate the airflow velocity differential. While such systems have been adequate, they require sophisticated electronics and controls, and are relatively expensive to produce and maintain.

SUMMARY OF THE INVENTION

There is a need for an air seeder that provides monitoring and regulation of airflow velocities within a pneumatic distribution system, to mitigate airflow velocities differentials between individual air lines. There is also a need for an air seeder that reduces the number of parts and electronic complexity of pneumatic distribution system monitoring devices. Furthermore, there is a need for air seeders with pneumatic distribution systems that can be regulated and adjusted manually and/or automatically on a per individual air line basis, whereby inconsistent seed coverage, underplanting, overplanting, and energy wasting can be managed and minimized.

The present invention provides an airflow velocity indicator and control mechanism or device which meets the desires and needs described above, while being used, e.g., in combination with an air seeder. In a first embodiment of the present invention, the air velocity indicator and control device includes an inlet and an outlet, with a tubular housing extending therebetween. A deflectable plate is provided in the housing and configured to actuate in response to encountering the airflow entrained with agricultural product. A magnitude of deflection of the deflectable plate is displayed through an indicator assembly, such that the indicator assembly shows a value for the airflow velocity through the device. This enables a user to identify velocity variances and differentials between various components of the air seeder and make corrective adjustments as desired.

It is contemplated for the deflectable plate to be mounted generally transversely in the tubular housing void space, and the deflectable plate to have a different perimeter shape than that of the inlet. In this configuration, the tubular housing can also have a different perimeter shape, and/or optionally the cross-sectional area, as compared to the inlet or the outlet, as desired.

In still further implementations, the deflectable plate actuates by pivotal movement within the tubular housing. This can be done by way of a pivot pin, attached to an upper edge of the deflectable plate that is mounted transversely through an upper portion of the tubular housing void space.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates an isometric view of a first embodiment of an airflow velocity indicator and control device in accordance with the present invention.

FIG. 2 illustrates a side elevational view of the airflow velocity indicator and control device shown in FIG. 1.

FIG. 3 illustrates an isometric view of a portion of the airflow velocity indicator and control device shown in FIG. 1, with portions of the sidewalls of the tubular deflector housing removed.

DETAILED DESCRIPTION OF THE PREFERRED EMBODIMENTS

Figure 4:
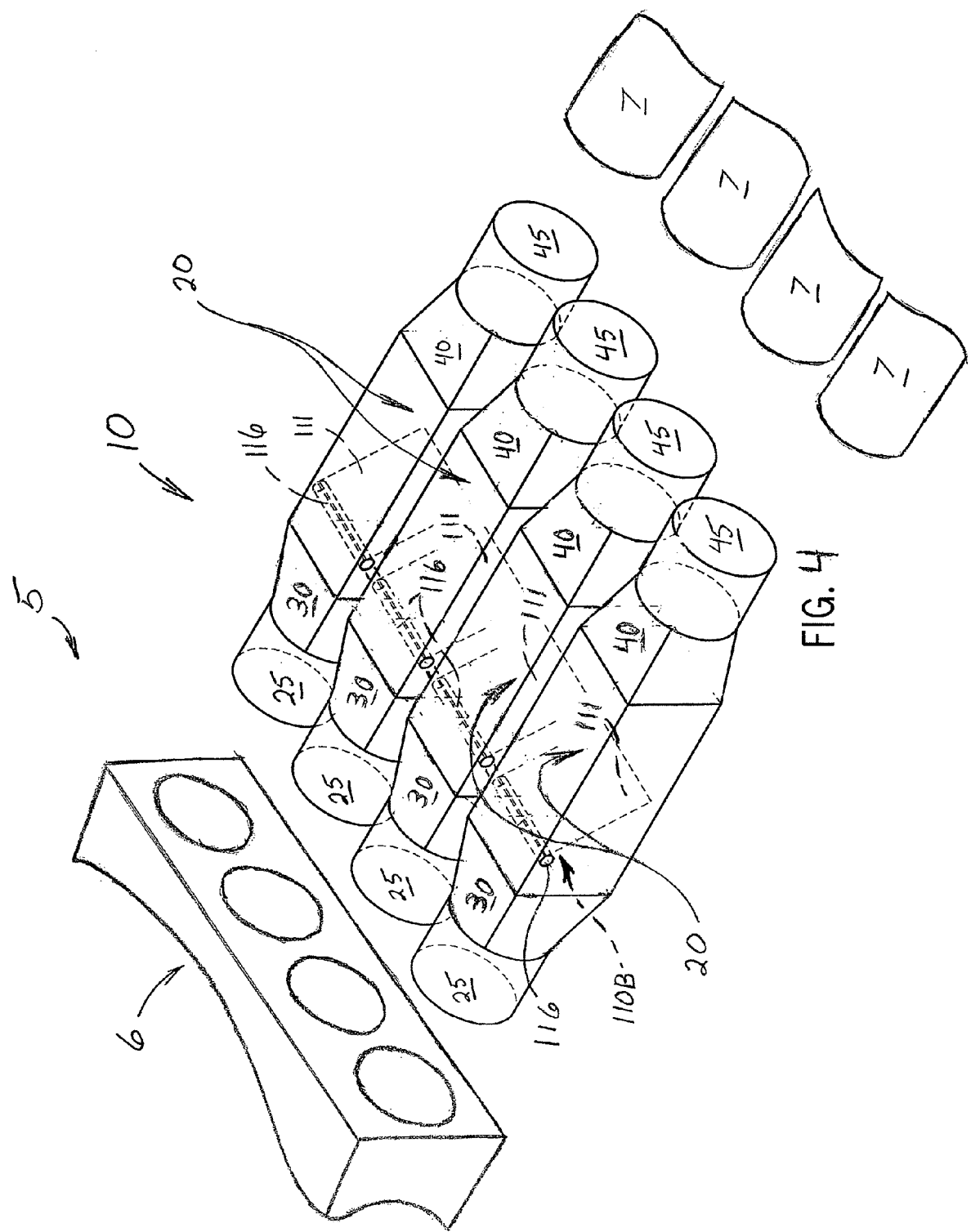
FIG. 4 illustrates an isometric view of multiple airflow velocity indicator and control devices, ganged together, in accordance with the present invention.

FIG. 1 shows a preferred embodiment of an air velocity indicator and control device 10 employed on a pneumatic distribution system 5 of an air seeder (not shown). Although no specific air seeder is illustrated, it is well understood that air velocity indicator and control device 10 can be incorporated into any of a variety of suitable air seeders and air seeder components, e.g. air carts and tillage implements, such as various ones manufactured by CNH America LLC. Suitable air carts include Case IH models ADX2230, ADX3380, ADX3430 air carts, and others. Suitable tillage implements include Case IH models ATX400 and ATX700 air hoe drills.

Notwithstanding, air velocity indicator and control device 10 can be used with yet other known and available air seeders. Known, readily available, air seeders typically include an air cart and a tilling implement, towed in tandem behind a tractor, for pneumatically distributing seed or other particulates or granular product such as fertilizer, herbicide, or other product. The air cart includes one or more frame-mounted product tanks for holding the granular product and each of the product tanks is connected to a product metering device which feeds the product into a pneumatic distribution system 5 in a controlled manner. Typically various components within the product metering devices and/or pneumatic distribution systems 5 are controlled, at least in part, by any of a variety of suitable electronic controls, e.g., an air seeder electronic control system.

Conventional pneumatic distribution systems 5 intake granular product from the metering device, and by way of a primary distribution manifold 6, mix, suspend, or entrain the product into an airflow that is produced and delivered by a centrifugal blower or fan. Controlling the rotational speed of the centrifugal fan, as well as mechanically controlling the orifice size through which the centrifugal fan delivers its airflow, influences a resultant airflow velocity within the pneumatic distribution system.

Typical air seeder pneumatic distribution systems 5 include multiple air cart air lines 7, connected to and extending between the primary distribution manifold(s) 6 and a series of secondary distribution manifolds, commonly referred to as "headers," illustrated as headers 8. The headers 8 further divide and distribute the airflow and entrained product through multiple tilling implement distribution air lines, to multiple ground openers or planting units for seed singulation on the tilling implement.

Referring now to FIGS. 1-3, air velocity indicator and control device 10 can be incorporated anywhere within the pneumatic distribution system 5 of an air seeder. However, it is preferable mounted downstream of a primary distribution manifold. For implementations of air velocity indicator and control device 10 that are retrofitted to existing air seeders, the device 10 is mounted with the pneumatic distribution system 5 at a location which is easily accessible, requires relatively little disassembly of the air seeder components, assemblies, or subassemblies, and thus facilitates simple installation. Such locations are where the existing air seeder has accessible mechanical linkages or couplers joining the various components of the pneumatic distribution system 5, e.g., between the (i) primary distribution manifold 6 and air cart air lines 7, (ii) air cart air lines 7 and headers 8, (iii) headers 8 and tilling implement distribution air lines, (iv) tilling implement distribution air lines and seed tubes or planting units, and/or (v) elsewhere as desired.

Air velocity indicator and control device 10 includes a body 20 and indicator assembly 100 that is mounted at least partially with the body 20. Body 20 is an assemblage of an inlet 25, an inlet transition segment 30, a tubular deflector housing 35, an outlet transition segment 40, and an outlet 45.

Inlet 25 is an elongate hollow member that provides an incoming conduit for the air velocity indicator and control device 10. The particular size, shape, and configuration of inlet 25 corresponds to the component it interfaces with, whereby inlet 25 is configured based at least in part on where in the pneumatic distribution system 5 it is located. Accordingly, for the implementations mounted between air cart air lines 7 and headers 8, such as those seen in FIGS. 1-3, the inlet 25 is round in cross-section and sized and configured to suitably couple to, e.g., a 2.5 inch or other air cart air line by a conventional mechanical coupler.

The end of inlet 25 that is proximate the remainder of air velocity indicator and control device 10 connects to an inlet transition segment 30. Inlet transition segment 30 has a first end 31 that is joined to inlet 25 and correspondingly approximates the dimensional attributes of the end of inlet 25. Multiple sidewalls 32, optionally a single circumferential sidewall 32, extend longitudinally from the first end 31. In some implementations, the sidewalls laterally diverge from the first end 31, defining an outwardly flared configuration.

In any event, the sidewalls 32 are joined to each other at respective lateral edges, whereby they, in combination, suitably covert the configuration of inlet 25 and first end 31 to join with the tubular deflector housing 35, by way of second end 33. Second end 33 is defined at the portion of inlet transition segment 30 which is distal inlet 25. Accordingly, the second end 33 interfaces with first end 36 of tubular deflector housing 35.

First end 36 of tubular deflector housing 35, in some implementations, appears square or rectangular as viewed in a front elevation. The particular perimeter shape of first end 36 of tubular deflector housing 35 is selected to correspond to the cross-sectional configuration of the medial portion of tubular deflector housing 35, characterized by a perimeter of combination of multiple sidewalls 37.

The cross-sectional configuration of tubular deflector housing 35, defined by the multiple sidewalls 37, can be any of a variety of arcuate or polygonal configurations, as desired. It is noted, however, that the perimeter defined about the outer surfaces of sidewalls 37, and thus the cross-sectional configuration of deflector house 35 corresponds to the particular configurations of various components of indicator assembly 100, explained in greater detail hereinafter. The sidewalls 37 terminate at their intersection with a second end 38 of tubular deflector housing 35. The second end 38 provides the interface between the tubular deflector housing 35 and the second transition segment 40, namely, the first end 41 of outlet transition segment 40.

Still referring to FIGS. 1-3, in implementations of tubular deflector housing 35 that have a generally constant cross-sectional configuration along its length, the first end 41 of the outlet transition segment 40 corresponds in size, shape, and configuration to the second end 33 of the inlet transition segment 30. In other words, when the ends 36, 38 of tubular deflector housing 35 are analogous, so too are the ends of the inlet and outlet transition segments 30, 40, namely, second end 33 and first end 41, respectively.

Multiple sidewalls 42, optionally a single circumferential sidewall 42, extend longitudinally from the first end 41. In some implementations, the sidewalls 42 laterally converge toward each other from the first end 41, defining an inwardly tapered configuration. Sidewalls 42 are joined to each other at respective lateral edges, whereby they, in combination, serve as the joining mechanism that connects the tubular deflector housing 35 with the outlet 45. Stated another way, second end 43 is defined at the portion of outlet transition segment 40 which is distal the tubular deflector housing 35, and attaches to outlet 45.

Outlet 45 is an elongate hollow member that provides an outgoing conduit for the air velocity indicator and control device 10. Like inlet 25, the particular size, shape, and configuration of inlet 45 corresponds to the particular component it interfaces with, within the pneumatic distribution system 5. For example, in implementations having the air velocity indicator and control device 10 mounted between air cart air lines 7 and headers 8, such as those seen in FIGS. 1-3, the outlet 45 is round in cross-section and sized and configured to suitably couple to a 2.5 inch or other header by a conventional mechanical coupler.

The airflow velocity and thus the velocity of the entrained product within the pneumatic distribution system 5, e.g., between the air cart air line 7 and header 8 as seen in FIGS. 1-3, is determined by way of an indicator assembly 100. Indictor assembly 100 includes a deflection plate assembly 110A and a gauge assembly 125.

Deflection plate assembly 110A includes a deflectable plate 111 pivotably housed between the inwardly facing surfaces of tubular deflector housing sidewalls 37, namely, within a void space 39. Referring now to FIG. 3, deflectable plate 111 is a planar, damper-type structure that defines a width dimension between opposing lateral edges 112, 113. This width dimension corresponds closely to the width dimension of the tubular deflector housing 35 void space, and thus, in some implementations, occupies a substantial portion of void space 39 with relatively small clearances between the lateral edges 112, 113 and the respective tubular deflector housing sidewalls 37.

Referring to FIG. 3, deflectable plate 111 defines a length dimension between an upper edge 114 and a lower edge 115. In a resting state, the lower edge 115 can sit upon, e.g., an upwardly facing surface of the lowermost sidewall 34. Preferably the length dimension of the deflectable plate 111 is greater in magnitude than the height dimension of the void space 39. In this configuration, the deflection extends angularly between an opposing pair of sidewalls 37 on opposite sides of the void space 39. In some implementations, the deflectable plate 111 extends angularly and downwardly from the uppermost sidewall 37 to the lowermost sidewall.

Upper edge 114 is attached to a pivot pin 116 that extends parallel to, but is spaced downwardly from, the uppermost sidewall 37. Pivot pin 116 defines an axis of pivotation about which the deflectable plate 111 articulates while the air seeder is being used. In some implementations, the deflectable plate 111 and pivot pin 116 are fixedly attached to each other, whereby they pivot or rotate in unison. Such configuration permits the pivot pin 116 to serve as the interface between the deflection plate assembly 110A and gauge assembly 125.

Gauge assembly 125 includes indicator arm 128, indicator scale 130, and can further include wiper arm 135, resistor 140, and conductors 145, as desired. Indicator arm 128 is fixedly mounted to an end of pivot pin 116, whereby it pivots or rotates in unison with both the pivot pin 116 and the deflectable plate 111. In other words, indicator arm 128 is a needle-type member that extends radially from the pivot pin 116. It is configured to be visually conspicuous against a scale indicating, e.g., airflow velocity, such as indicator scale 130. Accordingly, in combination, indicator arm 128 and indicator scale 130 provide a visual representation of the airflow velocity through air velocity indicator and control device 10 and thus through a respective segment of pneumatic distribution system 5.

As desired and/or as required for suitable operation and functionality, the gauge assembly 125 can further include a spring or other resilient member (not illustrated) to biasingly urge the deflectable plate 111, pivot pin 116, and indicator arm 128 toward their resting state positions. For example, a spring or other resilient member can be required when the mass of deflectable plate 111 is small enough, and the airflow velocity is great enough, that the indicator arm 128 is held against the indicia indicating a maximum value on the indicator scale 130.

In some implementations, it is desired to electronically monitor or determine the airflow velocities within the airflow velocity indicator assembly 100. In such implementations, various other components are provided to suitably sense or determine the position of deflectable plate 111, pivot pin 116, indicator arm 128, and/or other components of airflow velocity indicator assembly 100. This enables such mechanical positional information to be sensed, detected, or determined, and to also be conveyed to the air seeder electronic control system or other suitable controller or electronic control module.

In such implementations, the gauge assembly 125 can further include, e.g., wiper arm 135, resistor 140, and conductors 145. The wiper arm 135 is mounted to pivot pin 116 or attached directly to indicator arm 128, but in any event moves in unison with the indicator arm 128. Resistor 140 is attached to and extends along the length of the backside of indicator scale 130. While moving, wiper arm 135 is always in mechanical contact with the resistor such that the particular location of wiper arm 135 along the length of resistor 140 varies according to the position of indicator arm 128 and indicator scale 130.

When the wiper arm 135 and resistor 140 are energized, the resultant output voltage output across them changes, based on where the wiper arm 135 contacts the resistor 140 along its length. In other words, the wiper arm 135 and resistor 140 are configured as, e.g., a potentiometer or rheostat to provide a variable output voltage signal which the air seeder electronic control system interprets to determine the position of wiper arm 135 along resistor 140, indicator arm 128 along indicator scale 130, deflectable plate 111 within void space 39, and thus the velocity of the airflow flowing through air velocity indicator and control device 10.

Regardless of the particular monitoring methods, manually or electronically monitored or observed, the airflow entrained with product provides a force which deflects respective ones of the deflectable plates 111 and indicator arms 128. Correspondingly, the differential velocities will cause resulting deflection variances that are observable or can be monitored. Based on this information, in other words the variance or differential information, the airflow can be controlled manually or automatically to reduce the magnitude of the velocity differentials.

Referring now to FIG. 4, as desired, multiple air velocity indicator and control devices 10 or components thereof can be joined, ganged, banked, or otherwise linked together. Such configuration can be useful when the air velocity indicator and control devices 10 are mounted in relatively space-constricted areas, for example, at locations within pneumatic distribution system 5 where multiple air lines, such as air cart air lines 7, are in close proximity to each other, and/or for automatic regulation. Accordingly, multiple joined air velocity indicator and control devices 10 are well-suited for placement between primary distribution manifold 6 and air lines 7, or elsewhere as desired.

Regardless of the particular placement location within pneumatic distribution system 5, some implementations of joined air velocity indicator and control devices 10 are adapted and configured to automatically and passively self-regulate the volumes and velocities of airflow passing therethrough. This can be done by introducing analogous mechanical airflow restrictions, by way of deflectable plates 111 positioned at the same angle(s) of deflection, into airflows having differing velocities. Since the airflows have different velocities, analogous mechanical airflow restrictions correspondingly produce differing effects on such differing airflows. Air velocity indicator and control devices 10 exploit such tendencies of the analogously positioned deflectable plates 111 to produce differing effects in differing airflows to redirect or shunt portions of relatively high velocity airflows into relatively low velocity airflows. This is typically done by modifying the relative flow resistances defined through different bodies 20, which shunt or redirect portions of the upstream airflow through respective branches of pneumatic distribution system 5, whereby the lines 7 correspondingly define airflows that have relatively more similar velocities.

Still referring to FIG. 4, in some implementations, the air velocity indicator and control device 10 has multiple bodies 20 and a ganged deflection plate assembly 110B. Namely, the ganged deflection plate assembly 110B has a single, common pivot pin 116 which extends through all of the parallel adjacent bodies 20 effectively ganging all of the deflectable plates 111 together. In this configuration, all of the deflectable plates 111 are fixed to a common pivot pin 116, whereby the deflectable plates 111 must pivot or rotate in unison with each other. Thus, at a given point in time, the pivotal or rotational position of the deflectable plates 111 is a function of all forces applied to the ganged deflectable plate assembly 110B. Correspondingly, the position of a deflectable plate within its respective body 20 is determined not only by operating conditions and characteristics within any single body 20, but is also influenced by the operating conditions and characteristics within all other bodies 20. In other words, since the deflectable plates 111 pivot or rotate in unison with each other, pivoting a single deflectable plate 111 correspondingly changes the relative opening dimensions within all bodies 20 simultaneously. In this regard, pivoting, rotating, or otherwise actuating the ganged deflectable plate assembly 1110B dynamically changes the opening dimensions and air flow characteristics of all bodies 20 simultaneously.

Although the deflectable plates 111 pivot or rotate in unison with each other, they need not be provided at the same, or constant, relative angular orientations upon the pivot pin 116. Preferably, each of the deflectable plates 111 is independently and adjustably fixed or mounted to the pivot pin 116, by way of e.g., setscrew(s), grub screw(s), locking collar(s), and/or other suitable temporary fixation hardware or devices. As desired, the deflectable plates 111 can be in coplanar alignment with each other, while enabling the user to later adjust each of the deflectable plates 111 to intersect with the pivot pin 116 at a different angle(s) with respect to the outer circumferential surface of the pivot pin 116. This permits the user to adjust the default or resting state opening dimensions of the bodies 20, enabling airflow characteristic tuning to enhance the self-regulatory functionality of air velocity indicator and control device 10.

Since the entire volume of air flowing through the air velocity indicator and control device 10 originates from a single centrifugal fan, blower, or other source, airflow pressures, velocities, and volumes in each of the bodies 20 and air lines 7 are intimately related to those within all other bodies 20 and air lines 7. Differences in the values of pressures, volumes, and velocities between individual air lines 7 typically correspond to differences in airflow resistance values of the air lines 7. Generally, air lines 7 with low resistances have relatively high airflow velocities and air lines 7 with high resistances have relatively low airflow velocities, whereby pneumatic distribution systems 5 having differing airflow resistance values through different parallel components define airflow velocity differentials.

Still referring to FIG. 4, ganged deflectable plate assembly 110B mitigates the magnitudes of velocity differentials by applying an inversely resistive relationship to the low and high resistance air lines 7 moving the values of the differing airflow velocities toward a common value. Namely, within the air velocity indicator and control device 10, ganged deflectable plate assembly 110B introduces a relatively low resistance to the high resistance (low velocity) air lines 7 and a relatively high resistance to the low resistance (high velocity) air lines 7. In this regard, the ganged deflectable plate assembly 110B inversely influences or offsets the relative velocity status of the air lines 7, whereby the low velocity air lines 7 perceive a relatively small resistance and the high velocity air lines 7 perceive a relatively large resistance to mitigate the velocity differential.

Airflows passing through the high velocity lines thus lose energy and relative velocity by urging the ganged deflectable plate assembly 1110B further open. The low velocity lines 7 realize an opposite effect since the other, high velocity airflows increase the sizes of the opening within the bodies 20. Namely, airflows passing through the low velocity lines 7 increase their relative velocities by (i) losing velocity to a lesser rate or extent as compared to those flowing through the high velocity lines 7, or (ii) gaining actual velocity, since the high velocity airflows relieve some of the resistive burden from the low velocity lines 7 by urging the ganged deflectable plate assembly 110B further open. In this regard, the air velocity indicator and control device 10 influences each of the distinct airflows passing therethrough, whereby the resultant airflow velocities are closer to each other in magnitude, as compared to when the air velocity indicator and control device 10 is not utilized. In this manner, deviations from a velocity equilibrium of each of the airflows are attenuated or otherwise reduced, and, accordingly, so is the velocity differential.

Still referring to FIG. 4, it is apparent that during use, suitably consistent airflow velocities between the various airlines 7 are achieved by the automatic, passive, and mechanical self-regulation which is influenced, at least in part, by (i) the fluid dynamic characteristics of the individual airflows traversing the individual bodies 20, (ii) the relationships between the individual airflows traversing the individual bodies 20, (iii) the airflow induced mechanical reactive tendencies of the deflectable plates 111 within its respective body 20, and (iv) the cumulative effect(s) of such mechanical reactive tendencies of the deflectable plates 111 upon each of the airflows through the respective bodies 20 and the overall position of the ganged deflection plate assembly 110B.

Referring again to FIGS. 1-4, it is apparent that the air velocity indicator and control device 10 provides a simple, cost effective, primarily mechanical device and method for determining airflow velocity in various portions of a pneumatic distribution system 5 of an air seeder. This is because the air velocity indicator and control devices 10 can be easily mounted into existing joints or coupling sites of pneumatic distribution system 5, where mechanical fasteners or couplers are typically located. Furthermore, the air velocity indicator and control device 10 is devoid of sophisticated electronics and function primarily by way of simple, inexpensive, and reliable mechanical components. In other words, air velocity indicator and control device 10 enables monitoring and control of airflow velocities without having to determine particle velocity, which typically requires sensitive and sophisticated sensors and corresponding devices.

In light of the above, during use, the air velocity indicator and control devices 10 are either installed by the user at existing joints or points of intersection of the pneumatic distribution system 5 components, or are previously installed by the air seeder manufacturer. Providing an air velocity indicator and control devices 10 at each of the relevant pneumatic distribution system 5 components, such as at each air cart air line and/or header 8, the user can easily determine the relative velocities between the various air cart air lines 7 or headers 8. Based on this information, the user can manually reduce the velocity differential between respective ones of the various air cart air lines 7 or headers 8.

For example, the user can observe the position of each of the indicator arms 128 upon indicator scale 130, thereby using indicator assembly 100 to quantify or evaluate the airflow velocity in each of the air cart air lines 7 or headers 8. If one or more of the velocities is greater than the desired velocity, which might correspond, e.g., to the lowest observed velocity, the user can perform the needed upstream or downstream adjustments to effectuate the desired change in airflow velocity to manually reduce the velocity differential. In other words, the user can adjust the rotational speed of the centrifugal fan at the air cart, or actuate various baffles to widen or restrict various openings, or utilize other suitable known louvers or adjustable internal airflow resistors, within the relevant portion of the pneumatic distribution system 5, until the desired airflow velocity is achieved and the velocity differential attains an acceptably low value.

Referring again to FIG. 4, ganging the deflectable plates 111 to provide ganged deflectable plate assembly 110B enables the air velocity indicator and control device 10 to automatically and passively self-regulate the airflow velocities so that the velocity differentials are suitably small so that the air seeder operates acceptably without requiring a substantial capital investment from the user. In some implementations, the air velocity indicator and control device 10 obviates the need for indicator assembly 100 (FIGS. 1-3) or electronic sensors, feedback mechanisms, and/or controls, as desired. This regulation of airflow velocities in air lines 7 of seeders at a substantially lower cost as compared to sophisticated electronically controlled devices and systems.

While the invention has been shown and described with respect to particular embodiments, it is understood that alternatives and modifications are possible and are contemplated as being within the scope of the present invention. A wide variety of air seeders (e.g., conventional air seeders and respective air carts and tilling implements) can employ the air velocity indicator and control devices 10 of the present invention. In addition, it should be understood that the number of air velocity indicator and control devices 10 on the air seeder is not limiting on the invention.

Many changes and modifications could be made to the invention without departing from the spirit thereof. The scope of these changes will become apparent from the appended claims.

We claim:

1. An air seeder for distributing agricultural product, comprising:

a pneumatic distribution system having a control device;

said control device having a body and an indicator assembly mounted at least partially with said body;

said body having an inlet; an inlet transition segment, a tubular deflector housing defining an inner void space having multiple sidewalls, an outlet transition segment and an outlet; and an indicator assembly mounted on said tubular deflector housing including a deflector plate assembly and a gauge assembly operably coupled to the pneumatic distribution system; said gauge assembly operably coupled to said pneumatic distribution assembly; said deflector plate assembly includes a deflectable plate mounted transversely within the void space of the tubular housing;

wherein a volume of flowing air and entrained agricultural product flows through the tubular housing and actuates the plate, the gauge assembly displaying a magnitude of plate deflection.

2. The air seeder as in claim 1, wherein the deflectable plate actuates by pivoting.

3. The air seeder as in claim 1, wherein the deflectable plate pivots about an axis of pivotation extending transversely across an upper portion of the void space of the tubular housing.

4. The air seeder as in claim 3, wherein a pivot pin is fixed to the deflectable plate and defines the axis of pivotation.

5. The air seeder as in claim 3, wherein a pivot pin defines the axis of pivotation and is fixed to an upper edge of the deflectable plate.

6. The air seeder as in claim 1, wherein the deflectable plate defines a polygonal perimeter shape.

7. The air seeder as in claim 6, wherein the deflectable plate defines a generally rectangular perimeter shape.

8. The air seeder as in claim 1, wherein in a resting state, the deflectable plate extends angularly across the void space of the tubular housing.

9. The air seeder as in claim 1, wherein in a resting state, the deflectable plate extends downward and angularly across the void space of the tubular housing, contacting an upper wall and a lower wall of the tubular housing.

* * * * *